United States Patent
Chen et al.

(10) Patent No.: US 12,450,793 B2
(45) Date of Patent: Oct. 21, 2025

(54) SYSTEMS AND METHODS FOR PROCESSING BREAST SLICE IMAGES THROUGH AN ARTIFICIAL NEURAL NETWORK TO PREDICT ABNORMALITIES IN BREASTS

(71) Applicant: United Imaging Intelligence (Beijing) Co., Ltd., Beijing (CN)

(72) Inventors: Zhang Chen, Brookline, MA (US); Shanhui Sun, Lexington, MA (US); Xiao Chen, Lexington, MA (US); Yikang Liu, Cambridge, MA (US); Terrence Chen, Lexington, MA (US)

(73) Assignee: United Imaging Intelligence (Beijing) Co., Ltd., Beijing (CN)

( * ) Notice: Subject to any disclaimer, the term of this patent is extended or adjusted under 35 U.S.C. 154(b) by 447 days.

(21) Appl. No.: 17/948,775

(22) Filed: Sep. 20, 2022

(65) Prior Publication Data

US 2024/0095976 A1    Mar. 21, 2024

(51) Int. Cl.
*G06T 11/00*    (2006.01)

(52) U.S. Cl.
CPC ........ *G06T 11/003* (2013.01); *G06T 2210/41* (2013.01)

(58) Field of Classification Search
CPC . G06T 2207/30068; G06T 2207/20081; G06T 2207/10116; G06T 2207/20084; G06T 2207/10081; G06T 2210/41; G06V 2201/03; G06V 10/82
See application file for complete search history.

(56) References Cited

U.S. PATENT DOCUMENTS

| | | | | |
|---|---|---|---|---|
| 6,058,322 A | * | 5/2000 | Nishikawa | G06T 7/0012 382/128 |
| 2003/0194049 A1 | * | 10/2003 | Claus | G06T 11/005 378/22 |
| 2006/0177125 A1 | * | 8/2006 | Chan | G06T 7/44 382/128 |
| 2009/0296999 A1 | * | 12/2009 | Raundahl | G06V 10/763 382/128 |
| 2016/0314587 A1 | * | 10/2016 | Ishikawa | G16H 50/20 |
| 2017/0156629 A1 | * | 6/2017 | Jo | G01R 33/546 |
| 2018/0218495 A1 | * | 8/2018 | Ben-Ari | A61B 6/5258 |
| 2020/0008759 A1 | * | 1/2020 | Morita | A61B 6/025 |

(Continued)

OTHER PUBLICATIONS

Mehdy et al., Artificial Neural Networks in Image Processing for Early Detection of Breast Cancer, Computational and Mathematical Methods in Medicine, 2017, vol. 2017, Article ID 2610628, pp. 1-15, doi.org/10.1155/2017/2610628.*

(Continued)

*Primary Examiner* — Guillermo M Rivera-Martinez
(74) *Attorney, Agent, or Firm* — Zhong Law, LLC (57) ABSTRACT

Digital breast tomosynthesis (DBT) may provide richer information than full-field digital mammography (FFDM). DBT data such as DBT slices may be processed based on deep learning techniques such as using a neural network, and the DBT slices may be divided into groups and a predetermined number of representative images may be derived based on the grouping. The neural network may be configured to process the representative images to predict the presence or non-presence of a breast disease such as breast cancer.

16 Claims, 6 Drawing Sheets

(56) References Cited

U.S. PATENT DOCUMENTS

| | | | |
|---|---|---|---|
| 2020/0085393 A1* | 3/2020 | Zhang | A61B 6/54 |
| 2020/0178909 A1* | 6/2020 | Morita | A61B 6/502 |
| 2020/0253573 A1* | 8/2020 | Gkanatsios | G06T 11/008 |
| 2021/0052247 A1* | 2/2021 | Kobayashi | A61B 6/502 |
| 2021/0125334 A1* | 4/2021 | Lotter | A61B 6/502 |
| 2021/0166443 A1* | 6/2021 | Morita | A61B 8/5223 |
| 2021/0313043 A1* | 10/2021 | Kecskemethy | G06V 30/19173 |
| 2022/0164951 A1* | 5/2022 | Chui | G06F 18/214 |
| 2022/0237776 A1* | 7/2022 | Aliprandi | G06N 3/04 |
| 2022/0343513 A1* | 10/2022 | Ren | A61B 6/0414 |
| 2023/0206397 A1* | 6/2023 | Okumura | A61B 6/025 |
| | | | 345/428 |
| 2023/0267657 A1* | 8/2023 | Koshino | A61B 6/468 |

OTHER PUBLICATIONS

Buda et al., Detection of masses and architectural distortions in digital breast tomosynthesis: a publicly available dataset of 5,060 patients and a deep learning model, Nov. 13, 2020.

\* cited by examiner

SYSTEMS AND METHODS FOR PROCESSING BREAST SLICE IMAGES THROUGH AN ARTIFICIAL NEURAL NETWORK TO PREDICT ABNORMALITIES IN BREASTS

BACKGROUND

Breast cancer is a common cause of death among women in all parts of the world, accounting for a large part of new cancer cases and hundreds of thousands of deaths each year. Early screening and detection are key to improving the outcome of breast cancer treatment, and can be accomplished through mammography exams. Conventional mammography, however, is a two-dimensional (2D) imaging modality that involves projecting information collected from compressed breasts into 2D images. Since signals from objects above and below a pathology of interest may be clustered together during the projection, the 2D images obtained using conventional mammography techniques may include areas of tissue overlap and structure noise, making it difficult to detect potential breast diseases (e.g., lesions) and often resulting in false positive or false negative findings.

SUMMARY

Described herein are systems, methods, and instrumentalities associated with processing digital breast tomosynthesis (DBT) data such as DBT images. An apparatus capable of performing such tasks may include at least one processor that may configured to obtain a plurality of slice images of a breast (e.g., DBT slices), group the plurality of slice images into multiple groups, derive a pre-determined number of representative images of the breast based on the grouping, and process the pre-determined number of representative images through an artificial neural network (ANN) to detect an abnormality (e.g., breast cancer) in the breast. The plurality of slice images may be reconstructed based on x-ray images of the breast captured from different angles, and the total number of representative images derived may be pre-determined based on a setting of the artificial neural network such as the number of input channels of the ANN (e.g., if the ANN includes a 2D convolutional neural network (CNN)), a dimension of the ANN (e.g., if the ANN includes a 3D CNN), etc.

In some embodiments, deriving the pre-determined number of representative images of the breast based on the grouping may comprise deriving one or more representative images of the breast for each of the multiple groups based on the subset of slice images included in the group. The count of the subset of slice images included in each of the multiple groups may be the same across the groups, or the groups (e.g., at least two of the multiple groups) may include different numbers of slice images. In addition, the slice images in one group may overlap with the slice images in another group, and some slice images (e.g., a slice associated with breast skin) that may be determined to be irrelevant to the prediction of the abnormality may be excluded from the groups.

In some embodiments, the one or more representative images derived for each of the multiple groups may include one of the slice images in the group (e.g., a middle slice in the group), while in other embodiments the one or more representative images for each group may be derived based on respective statistical summaries of the subset of slice images in the group. The statistical summaries may include, for example, one or more of a maximum, a minimum, a mean/average, a standard deviation, a principal component analysis (PCA), or a singular value decomposition (SVD) of the slice images included in the group. In some embodiments, the plurality of slice images obtained by the apparatus described herein may be numbered sequentially based on a first set of sequence numbers, while the multiple groups may be numbered sequentially based on a second set of sequence numbers. The slice images in two consecutively numbered groups (e.g., group 1 and group 2), however, may not be consecutive (e.g., may be non-consecutive).

BRIEF DESCRIPTION OF THE DRAWINGS

A more detailed understanding of the examples disclosed herein may be had from the following description, given by way of example in conjunction with the accompanying drawings.

DETAILED DESCRIPTION

The present disclosure is illustrated by way of example, and not by way of limitation, in the figures of the accompanying drawings. A detailed description of illustrative embodiments will now be described with reference to the various figures. Although this description provides a detailed example of possible implementations, it should be noted that the details are intended to be exemplary and in no way limit the scope of the application.

Figure 1A:
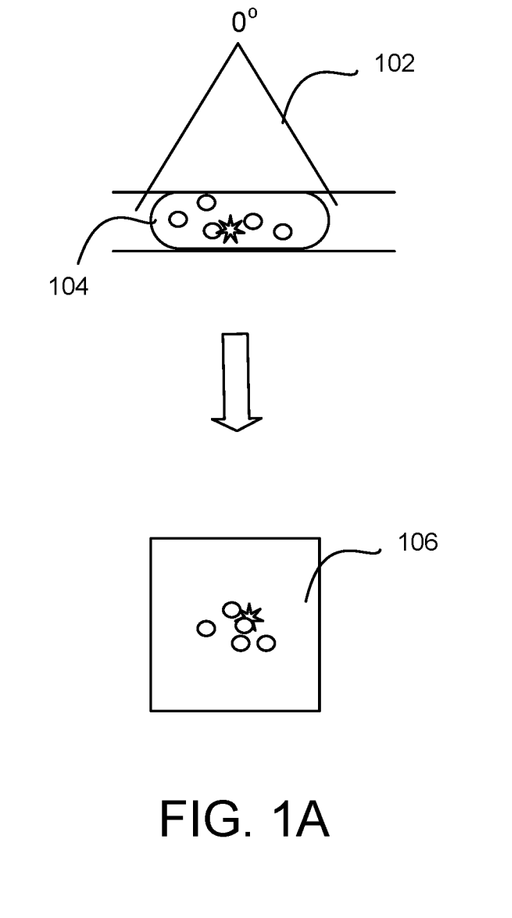
FIG. 1A and FIG. 1B are simplified diagrams illustrating examples of mammography techniques, according to some embodiments described herein.
Figure 1B:
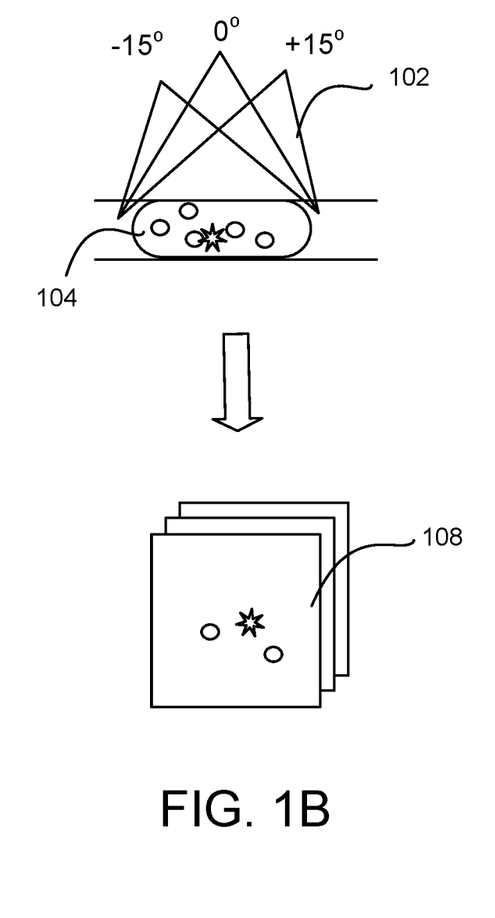

Mammography (mammogram) may be used to capture pictures of a breast from different views (e.g., craniocaudal (CC) view and/or mediolateral oblique (MLO) view). As such, a standard mammogram may include four pictures, e.g., a left CC (LCC), a left MLO (LMLO), a right CC (RCC), and a right MLO (RMLO). FIGS. 1A and 1B illustrate examples of mammography (mammogram) techniques, with FIG. 1A showing an example of full-field digital mammography (FFDM) and FIG. 1B showing an example of digital breast tomosynthesis (DBT). As shown in FIG. 1A, FFDM may be considered a 2D imaging modality that may involve passing a burst of X-rays 102 through a compressed breast 104 at a certain angel (e.g., perpendicular to the breast), capturing the X-rays 102 on the opposite side (e.g., using a solid-state detector), and producing a 2D image 106 of the breast based on the captured signals (e.g., the captured X-rays 102 may be converted to electronic signals, which may then be used to generate the 2D image 106). Using FFDM, the information of the whole breast may be incorporated into a single 2D image (e.g., the 2D image 106), leading to an overlap of normal breast tissues (e.g., represented by circles in FIG. 1A) and a potential lesion (e.g., represented by a star in FIG. 1A) in the resulting mammogram image. Such an overlap may obscure the presence of the lesion and increase the chance of false positive or false negative diagnoses.

In contrast, the DBT technique shown in FIG. 1B may achieve or resemble the quality of a 3D imaging modality (e.g., DBT may be considered a pseudo 3D imaging modality). As shown, the DBT technique may involve passing the burst of X-rays 102 through the compressed breast 104 at different angles (e.g., 0°, +15°, −15°, etc.) during a scan, acquiring one or more X-ray images of the breast at each of the angles, and reconstructing the individual X-ray images into a series of slices 108 (e.g., thin, high-resolution slice images) that may be displayed individually or as a movie (e.g., in a dynamic cine mode). As such, different from the example FFDM technique shown in FIG. 1A (e.g., which may project the breast 104 from only one angle), the example DBT technique shown in FIG. 1B may project the breast from multiple angles and reconstruct the data collected from those different angles into multiple slice images 108 (e.g., multi-slice data) in which the normal breast tissues (e.g., represented by circles in FIG. 1B) may be clearly distinguished from the lesion (e.g., represented by a star in FIG. 1B). This technique may reduce or eliminate the problems caused by 2D mammography imaging (e.g., the FFDM technique described herein), resulting in improved diagnostic and screening accuracy.

It should be noted that although FIG. 1B shows only three angles at which x-ray images of the breast 104 are taken, those skilled in the art will appreciate that more angles may be used and more images may be taken during a practical DBT procedure. For example, 15 images of the breast may be taken in an arc from the top and the side of the breast, which may then be reconstructed into multiple non-overlapping slices through the breast. Those skilled in the art will also appreciate that, although not shown in FIG. 1B, a DBT scan may include different views of each breast including, for example, LCC, LMLO, RCC, and RMLO.

The DBT technology described herein may provide richer information about breast diseases (e.g., such as breast cancer) than the FFDM technology, but the large amount of data generated during a DBT procedure (e.g., 40 to 80 slices per view per breast) may pose new challenges for clinicians since, for example, it may be much more time-consuming to read DBT data than FFDM data. Hence, embodiments of the present disclosure employ artificial intelligence (AI) to dissect, analyze, and/or summarize DBT data (e.g., DBT slice images). For instance, as shown in the example in FIG. 2, machine learning (ML) techniques such as artificial neural networks (ANN) may be used to acquire knowledge about breast diseases (e.g., abnormalities such as lesions) through training, and thereafter automatically detect the breast diseases when given the DBT data (e.g., slice images) of a patient. Various technique may also be employed to prepare (e.g., pre-process) the DBT data so as to utilize a commonly trained ML model (e.g., an artificial neural network) for different types of DBT data (e.g., which may include different numbers of slices), to reduce the data load on the ML model, etc.

Figure 2:
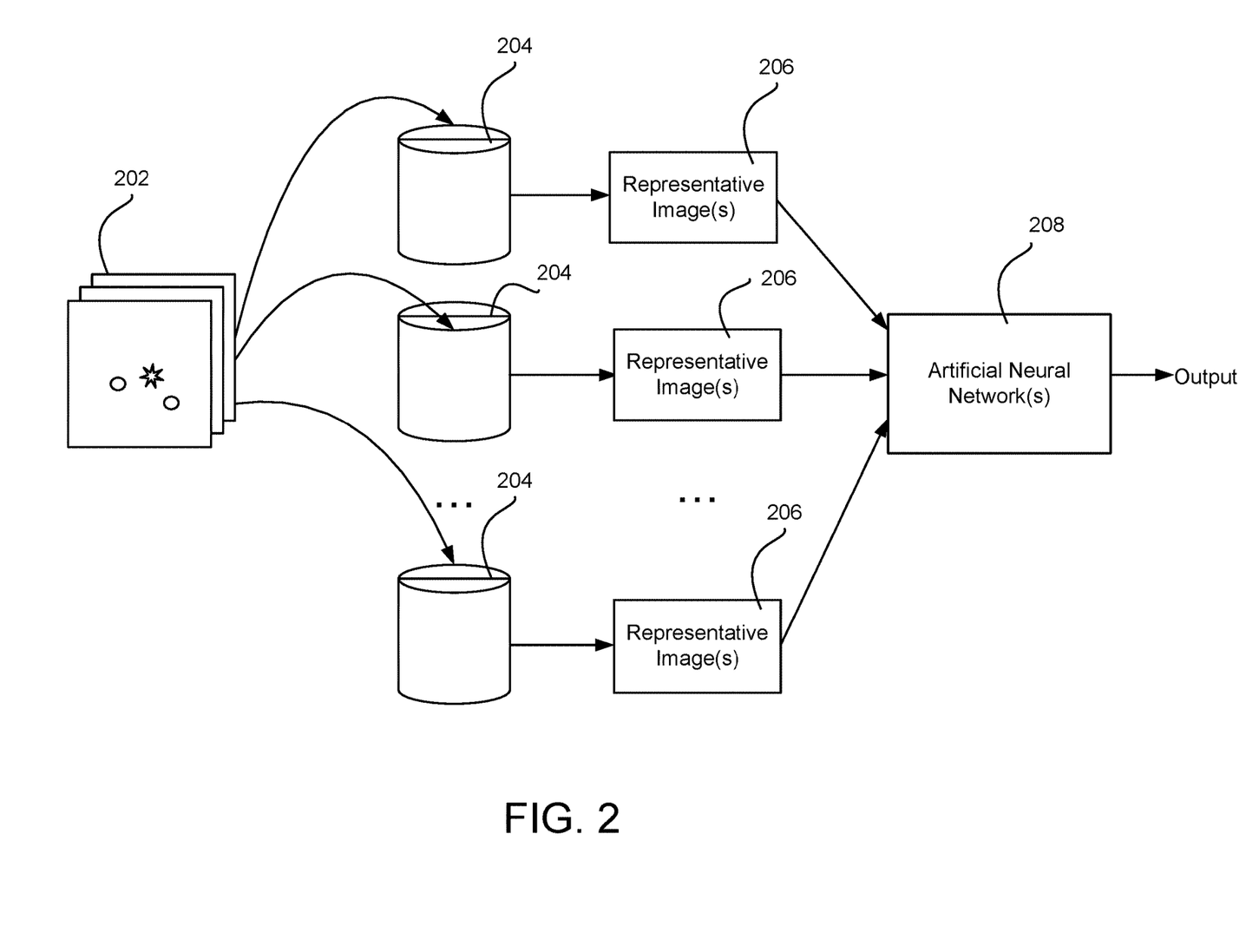
FIG. 2 is a simplified diagram illustrating an example of using machine learning (ML) techniques to process DBT data, according to some embodiments described herein.

As shown in FIG. 2, an AI-based system or apparatus configured to process DBT data may be configured to obtain a plurality of DBT slices 202 (e.g., slice images) of a breast, wherein the slice images may be reconstructed based on X-ray images of the breast captured from different angles (e.g., as described with reference to FIG. 1). The AI-based system or apparatus may be further configured to group or divide (e.g., in a pre-processing step) the plurality of slice images of the breast into multiple groups 204 (e.g., with each group including a subset of the plurality of slice images 202), and derive a pre-determined (e.g., fixed) number of representative images 206 of the breast based on the grouping. For instance, one or more representative images may be derived for each of the multiple groups based on the subset of slice images included in the group, and the total number of representative images derived for the multiple groups may be fixed (e.g., based on a criteria described herein). The AI-based system or apparatus may then process the representative image(s) 206 through an artificial neural network (ANN) 208 to make a prediction about an abnormality (e.g., lesion) that may exist in the breast, for example, at an output of the ANN 208. The examples provided herein may refer to the ANN 208 in a singular form, but those skilled in the art will appreciate that one or more ANNs may be used to accomplish the tasks described herein.

The ANN 208 may include various types of neural networks including, for example, a 2D convolutional neural network (CNN), a 3D convolutional neural network, a transformer neural network, and/or the like. In examples where the ANN 208 includes a 2D CNN characterized by a number of input channels, a count (e.g., total) of the representative images derived for the multiple groups 204 may be equal to the number of input channels of the ANN (e.g., each representative images 206 may be provided to a respective input channel of the 2D CNN). For instance, if the 2D CNN has four input channels, four representative images 206 may be derived (e.g., based on four or fewer groups), and if the 2D CNN has six input channels, six representative images 206 may be derived (e.g., based on six or fewer groups). In examples where the ANN 208 includes a 3D CNN or another type of neural network(s), the techniques described herein may still be utilized, for example, to reduce the number of DBT slices or amount of data that the neural network may be tasked with processing. For instance, if the 3D CNN has a W dimension (e.g., corresponding to the width of an input image), an H dimension (e.g., corresponding to the height of an input image), and a Z dimension (e.g., corresponding to time values or depth values in space), the number of representative images 206 generated may be pre-determined (e.g., fixed) based on the Z dimension of the 3D CNN. As will be described in greater detail below, the grouping or division of the DBT slice images 202 and/or the derivation of the representative image(s) 206 may be performed in various manners. In addition, in at least some examples, not all of the DBT slice images 202 may be included in the groups 204 (e.g., some slice images may be excluded if they are determined to be irrelevant to the abnormality prediction), and the DBT slice images 202 may or may not be assigned to the groups 204 based on the sequential order of the DBT slice images.

The ANN 208 may include a plurality of layers such as one or more convolution layers, one or more pooling layers, and/or one or more fully connected layers. Each of the convolution layers may include a plurality of convolution kernels or filters configured to extract features from an input image (e.g., the representative image(s) 206) received at an input channel. The convolution operations may be followed by batch normalization and/or linear (or non-linear) activation, and the features extracted by the convolution layers may be down-sampled through the pooling layers and/or the fully connected layers to reduce the redundancy and/or dimension of the features, so as to obtain a representation of the down-sampled features (e.g., in the form of a feature vector or feature map). In some examples (e.g., if the detection of the breast abnormality includes segmenting the abnormal area in the corresponding medical image), the ANN 208 may further include one or more un-pooling layers and one or more transposed convolution layers that may be configured to up-sample and de-convolve the features extracted through the operations described above. As a result of the up-sampling and de-convolution, a dense feature representation (e.g., a dense feature map) of the input image may be derived, and the ANN 208 may be trained (e.g., parameters of the ANN may be adjusted) to predict the presence or non-presence of an abnormality (e.g., lesion) in the input image based on the feature representation. As will be described in greater detail below, the training of the ANN 208 may be conducted based on publicly available DBT slice images comprising breast masses and/or architectural distortions, and the parameters of the ANN 208 may be adjusted (e.g., learned) based on various loss functions.

Figure 3A:
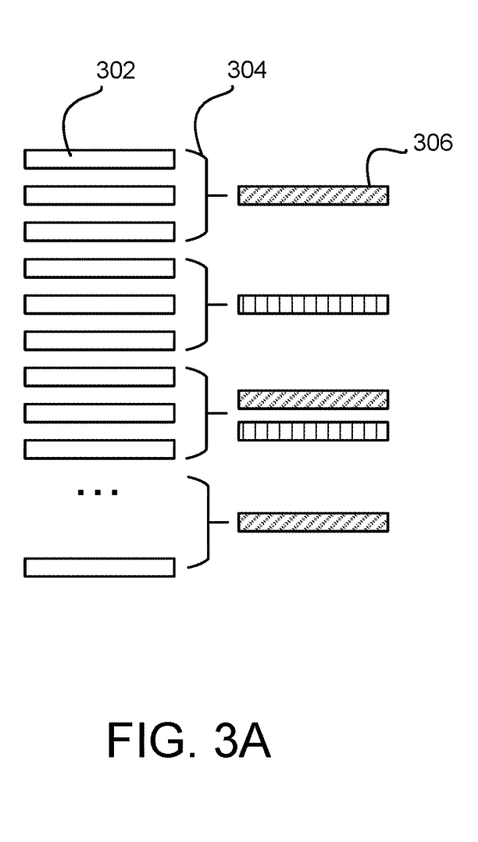
FIGS. 3A, 3B and 3C are simplified diagrams illustrating example techniques for dividing DBT slices into groups and deriving representative image(s) for each of the groups, according to some embodiments described herein.
Figure 3B:
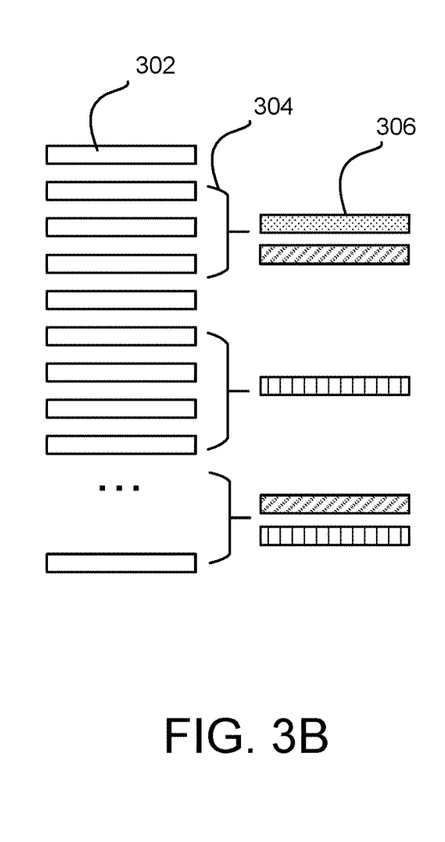
Figure 3C:
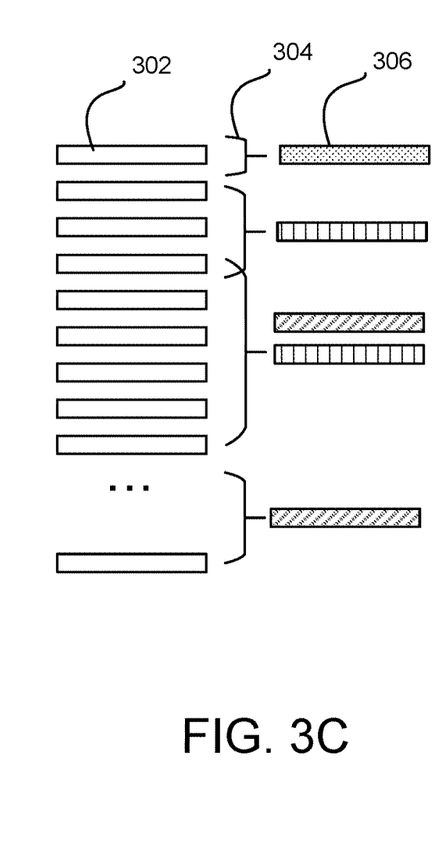

FIGS. 3A, 3B, and 3C illustrate example ways for dividing a plurality of DBT slices (e.g., slice images) into groups, and deriving representative image(s) for each of the groups. As shown in the examples, a plurality of DBT slices 302 may be divided into multiple groups or bins 304, the number of which may or may not be fixed. The grouping may be performed in various manners, for example, with an objective to suit the structure of the ANN and/or to optimize the performance of the ANN. For instance, the DBT slices 302 may be divided in an approximately even manner (e.g., as shown in FIG. 3A) based on the total number of groups, or the DBT slices 302 may be divided unevenly (e.g., the number of slices in different groups may be different, as shown in FIGS. 3B and 3C). At least one of the groups 304 may include multiple DBT slices, and the subsets of DBT slices between two different groups may overlap (e.g., slices 1-5 and 3-7 may be put into groups 1 and 2, respectively). Some slices may be excluded during the grouping or division. For example, as shown in FIG. 3B, if a slice (e.g., a slice associated with breast skin) is determined to be irrelevant (e.g., make little or no contribution) to the detection of breast abnormalities, that slice may not be included in any of the groups 304. Additionally, while the DBT slices 302 and/or groups 304 may be associated with respective sequence numbers (e.g., first and second sequence numbers), the slices assigned to consecutive groups may or may not be consecutive themselves. For instance, slice 1 to 5 of the DBT slices 302 may be assigned to group 1, while slice 7-11 of the DBT slices 302 may be assigned to group 2, etc.

For each of the groups 304 described herein, one or more representative images 306 may be derived based on the subset of slices included in the group, and the total number of representative images 306 derived (e.g., for all groups 304) may be fixed (e.g., based on the structure and/or settings of the artificial neural network (e.g., such as the ANN 208 of FIG. 2). The derivation of these representative images may be performed in various manners. For example, the one or more representative images for each group 304 may include one of the slices in the group (e.g., the middle slice in a group may be used as a representative image of the group). As another example, a representative image for each group 304 may include an image that is derived based on a statistical summary of the slices in the group including, e.g., a maximum, a mean/average, a minimum, a standard deviation, or a combination thereof associated with the slices of the group. As yet another example, a representative image for each group 304 may include an image that is derived based on a principal component analysis (PSA) of the slices in the group or a singular value decomposition (SVD) of the slices in the group. For instance, a representative image for a group 304 may be derived by selecting the maximum value at each corresponding pixel location across all slices in the group. The number of representative image(s) 306 derived for each group 304 and/or the manner in which these images are derived may be the same or may be different. For example, the differently shaded areas in FIGS. 3A-3C illustrate that different derivation methods may be applied to different groups (e.g., some images may be derived based on max image values while others may be derived based on mean or average values), and that different numbers of representative images may be derived for different groups (e.g., some groups may have one representative image while other groups may have two or more representative images).

Figure 4:
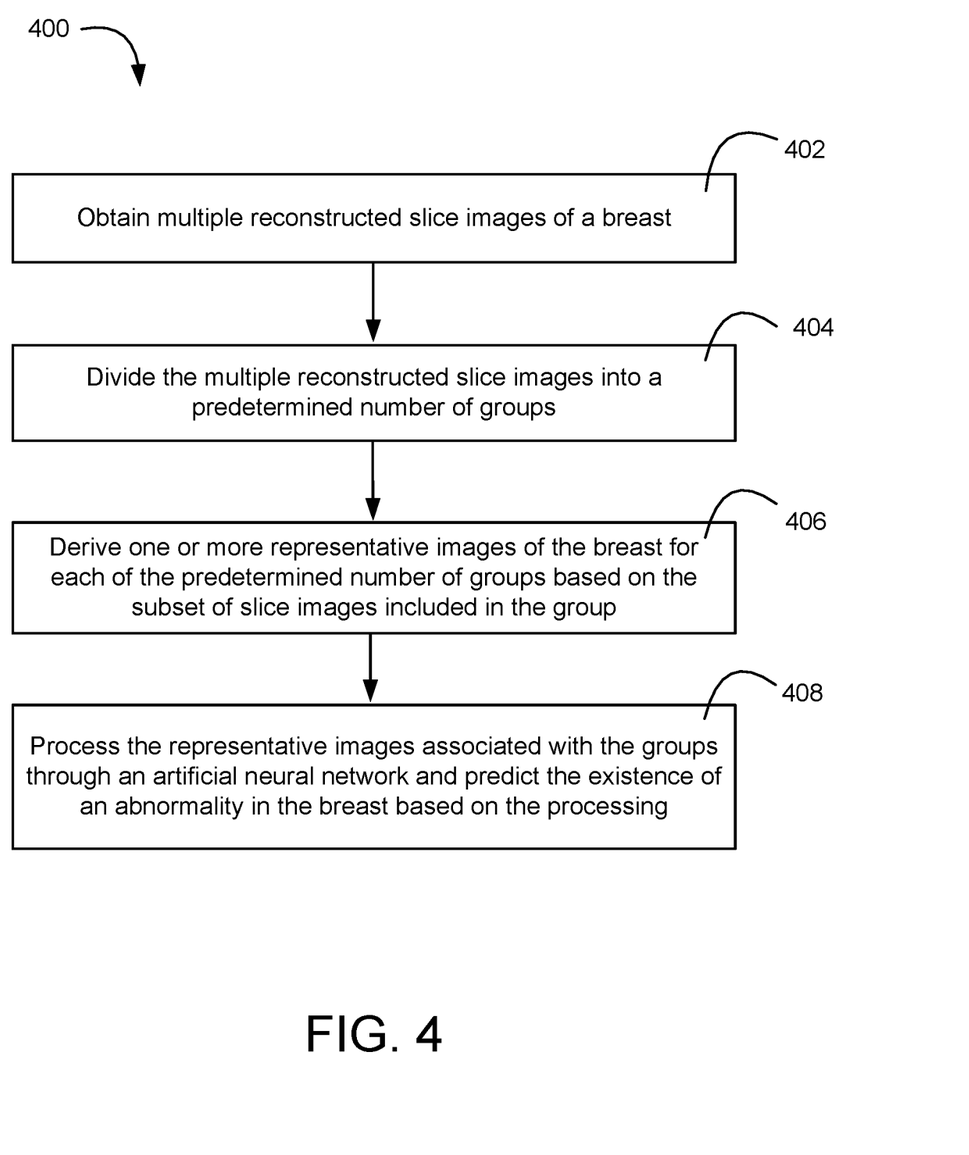
FIG. 4 is a flow diagram illustrating an example method for processing DBT data, according to some embodiments described herein.

FIG. 4 illustrates an example method 400 for processing DBT data (e.g., DBT slices) in accordance with some embodiments of the present disclosure. The method 400 may be implemented by an AI-based system or apparatus as described herein. The method may include obtaining multiple reconstructed slice images of a breast (e.g., DBT slices) at 402, where the slice images may be reconstructed based on X-ray images of the breast captured at different angles (e.g., as described with reference to FIG. 1). The method 400 may further include dividing (e.g., in a pre-processing step) the multiple slice images of the breast into a pre-determined number of groups at 404, with each group including a subset of the multiple slice images, and deriving, at 404, one or more representative images of the breast for each of the pre-determined number of groups based on the subset of slice images included in the group. The method 400 may additionally include processing, at 408, the one or more representative images associated with each of the pre-determined number of groups through an artificial neural network (ANN) to make a prediction about an abnormality (e.g., lesion) detected in the representative image(s). As described herein, the total number of groups into which the slice images are divided may be fixed, for example, based on the number of input channels of the ANN. Also as described herein, the ANN may be pre-trained to acquire knowledge about the abnormality based on training data comprising normal breasts and breasts having the abnormal condition such that, when given the DBT data of a patient, the ANN may be able to identify the abnormal condition utilizing the knowledge acquired through the training.

Figure 5:
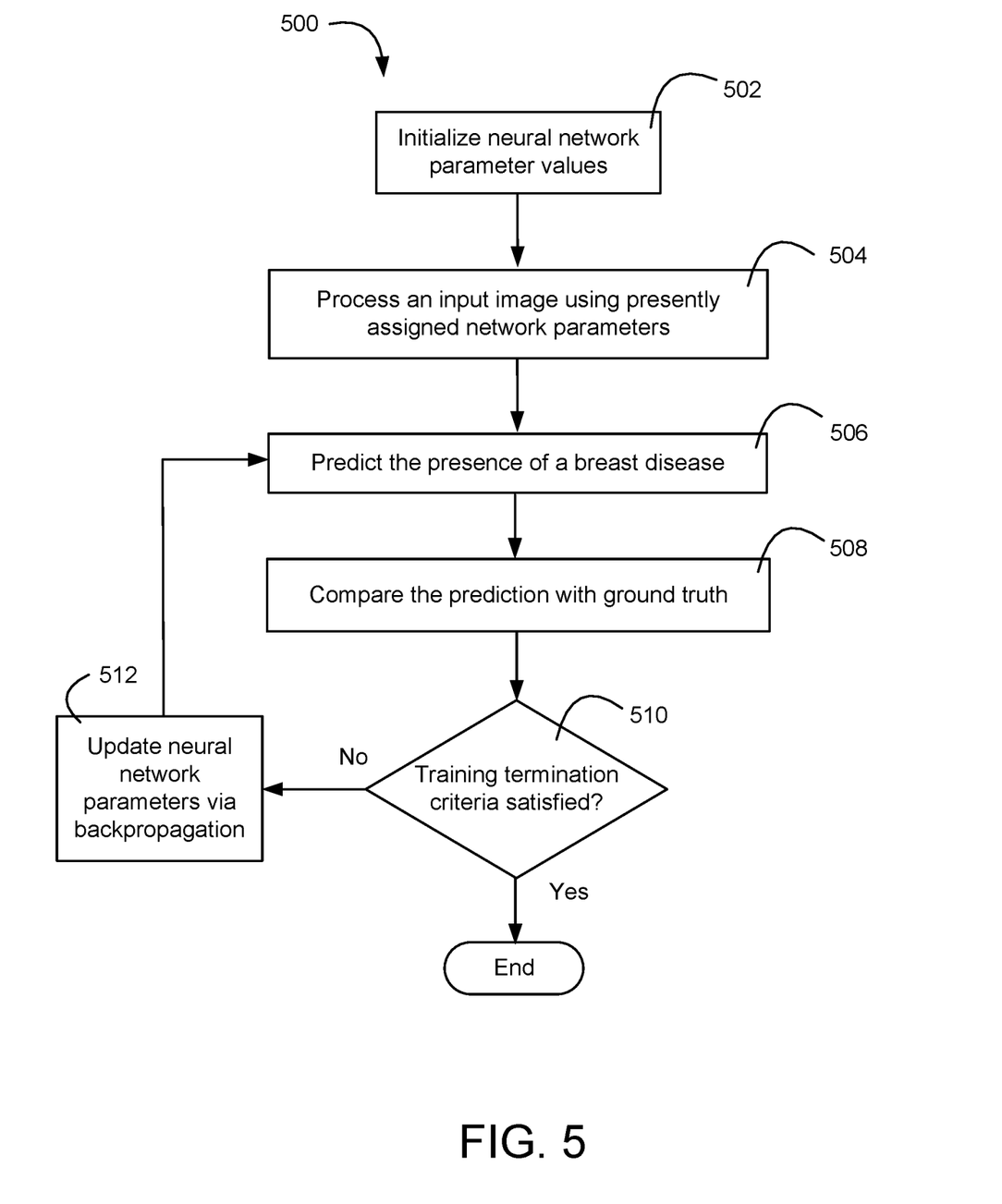
FIG. 5 is a flow diagram illustrating an example method for training a neural network to perform one or more of the tasks as described with respect to some embodiments provided herein.

FIG. 5 shows a flow diagram illustrating an example process 500 for training a neural network (e.g., a ML model implemented by the neural network) to perform one or more of the tasks described herein. As shown, the training process 500 may include initializing the operating parameters of the neural network (e.g., weights associated with various layers of the neural network) at 502, for example, by sampling from a probability distribution or by copying the parameters of another neural network having a similar structure. The training process 500 may further include processing an input (e.g., a training image such as the representative image 306 shown in FIG. 3) using presently assigned parameters of the neural network at 504, and making a prediction about the presence of a breast disease (e.g., a lesion) at 506. The prediction result may be compared, at 508, to a ground truth that indicates a true status of the breast disease (e.g., whether the disease truly exists) to determine a loss associated with the prediction based on a loss function. The loss function employed for the training may be selected based on the specific task that the neural network is trained to do. For example, if the task involves a classification or segmentation of the input image, a loss function based on calculating a mean squared error between the prediction result and the ground truth, an L1 norm, an L2 norm, etc. may be used, and if the task involves detecting the location of an abnormal area (e.g., by drawing a bounding box) around the abnormal area, a loss function based on generalized intersection over union (GIOU) may be used.

At 510, the loss calculated using one or more of the techniques described above may be used to determine whether one or more training termination criteria are satisfied. For example, the training termination criteria may be determined to be satisfied if the loss is below a threshold value or if the change in the loss between two training iterations falls below a threshold value. If the determination at 510 is that the termination criteria are satisfied, the training may end; otherwise, the presently assigned network parameters may be adjusted at 512, for example, by back-propagating a gradient descent of the loss function through the network before the training returns to 506.

For simplicity of explanation, the training steps are depicted and described herein with a specific order. It should be appreciated, however, that the training operations may occur in various orders, concurrently, and/or with other operations not presented or described herein. Furthermore, it should be noted that not all operations that may be included in the training method are depicted and described herein, and not all illustrated operations are required to be performed.

Figure 6:
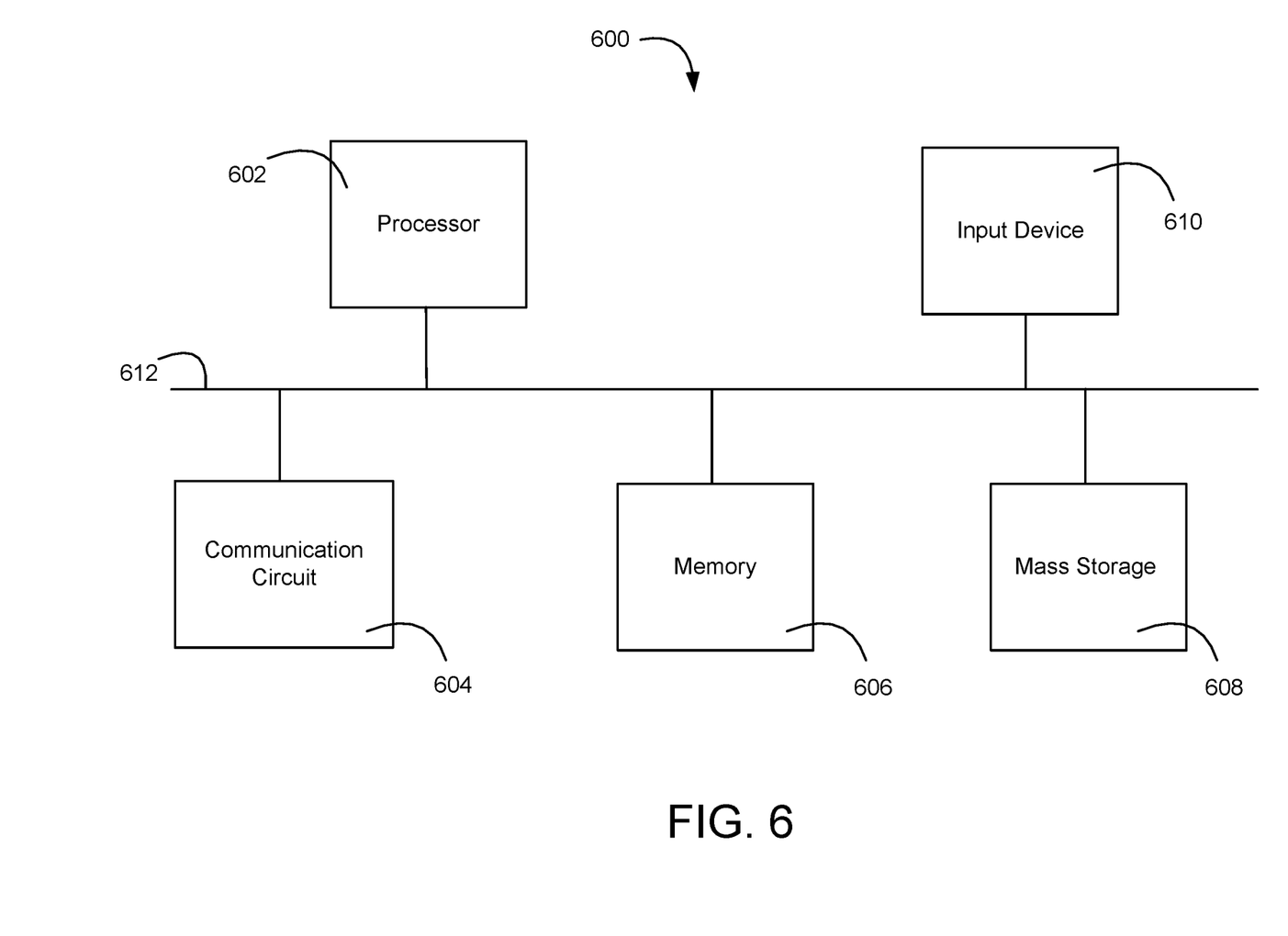
FIG. 6 is a simplified block diagram illustrating an example system or apparatus for performing one or more of the tasks as described with respect to some embodiments provided herein.

The systems, methods, and/or instrumentalities described herein may be implemented using one or more processors, one or more storage devices, and/or other suitable accessory devices such as display devices, communication devices, input/output devices, etc. FIG. 6 illustrates an example apparatus 600 that may be configured to perform the tasks described herein. As shown, apparatus 600 may include a processor (e.g., one or more processors) 602, which may be a central processing unit (CPU), a graphics processing unit (GPU), a microcontroller, a reduced instruction set computer (RISC) processor, application specific integrated circuits (ASICs), an application-specific instruction-set processor (ASIP), a physics processing unit (PPU), a digital signal processor (DSP), a field programmable gate array (FPGA), or any other circuit or processor capable of executing the functions described herein. Apparatus 600 may further include a communication circuit 604, a memory 606, a mass storage device 608, an input device 610, and/or a communication link 612 (e.g., a communication bus) over which the one or more components shown in the figure may exchange information.

Communication circuit 604 may be configured to transmit and receive information utilizing one or more communication protocols (e.g., TCP/IP) and one or more communication networks including a local area network (LAN), a wide area network (WAN), the Internet, a wireless data network (e.g., a Wi-Fi, 3G, 4G/LTE, or 5G network). Memory 606 may include a storage medium (e.g., a non-transitory storage medium) configured to store machine-readable instructions that, when executed, cause processor 602 to perform one or more of the functions described herein. Examples of the machine-readable medium may include volatile or non-volatile memory including but not limited to semiconductor memory (e.g., electrically programmable read-only memory (EPROM), electrically erasable programmable read-only memory (EEPROM)), flash memory, and/or the like. Mass storage device 608 may include one or more magnetic disks such as one or more internal hard disks, one or more removable disks, one or more magneto-optical disks, one or more CD-ROM or DVD-ROM disks, etc., on which instructions and/or data may be stored to facilitate the operation of processor 602. Input device 610 may include a keyboard, a mouse, a voice-controlled input device, a touch sensitive input device (e.g., a touch screen), and/or the like for receiving user inputs to apparatus 600.

It should be noted that apparatus 600 may operate as a standalone device or may be connected (e.g., networked or clustered) with other computation devices to perform the tasks described herein. And even though only one instance of each component is shown in FIG. 6, a skilled person in the art will understand that apparatus 600 may include multiple instances of one or more of the components shown in the figure.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure. In addition, unless specifically stated otherwise, discussions utilizing terms such as "analyzing," "determining," "enabling," "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

It is to be understood that the above description is intended to be illustrative, and not restrictive. Many other implementations will be apparent to those of skill in the art upon reading and understanding the above description.

What is claimed is:

1. An apparatus, comprising:
at least one processor configured to:
obtain a plurality of slice images of a breast, wherein the plurality of slice images is reconstructed based on x-ray images of the breast captured from different angles;
group the plurality of slice images into multiple groups, wherein each of the multiple groups includes a respective subset of slice images from the plurality of slice images;
derive a pre-determined number of representative images of the breast based on a respective statistical summary of the respective subset of slice images included in each of the multiple groups; and
process the pre-determined number of representative images through an artificial neural network (ANN), wherein the ANN is trained for detecting an abnormality in the breast, wherein a prediction for the abnormality is made as a result of the processing, and wherein a count of the pre-determined number of representative images is dependent on a structural property of the ANN.

2. The apparatus of claim 1, wherein the ANN includes a two-dimensional convolutional neural network (2D CNN) characterized by a number of input channels, and wherein the count of the pre-determined number of representative images is equal to the number of input channels of the 2D CNN.

3. The apparatus of claim 1, wherein the ANN includes a three-dimensional convolutional neural network (3D CNN), and wherein the count of the pre-determined number of representative images is determined based on a dimension of the 3D CNN.

4. The apparatus of claim 1, wherein the respective statistical summary of the respective subset of slice images in each of the multiple groups include one or more of a maximum, a minimum, a mean, a standard deviation, a principal component analysis, or a singular value decomposition of the subset of slice images in each of the multiple groups.

5. The apparatus of claim 1, wherein the plurality of slice images of the breast is assigned consecutive sequence numbers, wherein the multiple groups include a first group and a second group that are numbered consecutively, and wherein the sequence numbers assigned to the subset of slice images in the first group are non-consecutive with the sequence numbers assigned to the subset of slice images in the second group.

6. The apparatus of claim 1, wherein at least two of the multiple groups include different numbers of slice images.

7. The apparatus of claim 1, wherein at least two of the multiple groups include a same slice image.

8. The apparatus of claim 1, wherein the at least one processor being configured to group the plurality of slice images into the multiple groups comprises the at least one processor being configured to determine that one or more of the plurality of slice images are irrelevant to the prediction of the abnormality and exclude the one or more slice images from the multiple groups.

9. A method of processing medical images, the method comprising:
   obtaining a plurality of slice images of a breast, wherein the plurality of slice images is reconstructed based on x-ray images of the breast captured from different angles;
   grouping the plurality of slice images into multiple groups, wherein each of the multiple groups includes a respective subset of slice images from the plurality of slice images;
   deriving a pre-determined number of representative images of the breast based on a respective statistical summary of the respective subset of slice images included in each of the multiple groups; and
   processing the pre-determined number of representative images through an artificial neural network (ANN), wherein the ANN is trained for detecting an abnormality in the breast, wherein a prediction for the abnormality is made as a result of the processing, and wherein a count of the pre-determined number of representative images is dependent on a structural property of the ANN.

10. The method of claim 9, wherein the ANN includes a two-dimensional convolutional neural network (2D CNN) characterized by a number of input channels, and wherein the count of the pre-determined number of representative images is equal to the number of input channels of the 2D CNN.

11. The method of claim 9, wherein the ANN includes a three-dimensional convolutional neural network (3D CNN), and wherein the count of the pre-determined number of representative images is determined based on a dimension of the 3D CNN.

12. The method of claim 9, wherein the respective statistical summary of the respective subset of slice images in each of the multiple groups include one or more of a maximum, a minimum, a mean, a standard deviation, a principal component analysis, or a singular value decomposition of the subset of slice images in each of the multiple groups.

13. The method of claim 9, wherein the plurality of slice images of the breast is assigned consecutive sequence numbers, wherein the multiple groups include a first group and a second group that are numbered consecutively, and wherein the sequence numbers assigned to the subset of slice images in the first group are non-consecutive with the sequence numbers assigned to the subset of slice images in the second group.

14. The method of claim 9, wherein at least two of the multiple groups include different numbers of slice images.

15. The method of claim 9, wherein at least two of the multiple groups include a same slice image.

16. The method of claim 9, grouping the plurality of slice images into the multiple groups comprises determining that one or more of the plurality of slice images are irrelevant to the prediction of the abnormality and excluding the one or more slice images from the multiple groups.

* * * * *